United States Patent [19]
Inoue

[11] Patent Number: 5,681,236
[45] Date of Patent: Oct. 28, 1997

[54] TOROIDAL CONTINUOUS VARIABLE TRANSMISSION

[75] Inventor: Eiji Inoue, Sagamihara, Japan

[73] Assignee: Isuzu Motors Limited, Tokyo, Japan

[21] Appl. No.: 605,502

[22] Filed: Feb. 26, 1996

[30] Foreign Application Priority Data

Feb. 27, 1995 [JP] Japan .................................. 7-061620
Feb. 27, 1995 [JP] Japan .................................. 7-061621

[51] Int. Cl.$^6$ .................................................. F16H 15/38
[52] U.S. Cl. .................................................. 476/10; 477/50
[58] Field of Search .................................. 476/10; 477/50

[56] References Cited

U.S. PATENT DOCUMENTS 4,434,675  3/1984  Kraus ......................................... 477/50

FOREIGN PATENT DOCUMENTS 61-82065   4/1986  Japan .
61-127965  6/1986  Japan .
61-184262  8/1986  Japan .
62-46060   2/1987  Japan .

*Primary Examiner*—Allan D. Herrmann
*Attorney, Agent, or Firm*—Browdy and Neimark

[57] ABSTRACT

When a failure occurs with the electrical system while the car is traveling at low speed, the toroidal continuous variable transmission fixes the transmission ratio to a value on the speed-decrease side, so that the car can start even when the car stops on a slope or it is heavily loaded. Further, when one spool valve is at the neutral position and if one of the trunnions supporting the power rollers should receive a force due to torque variations in the input disk, the other trunnion is not affected at all and not displaced.

7 Claims, 5 Drawing Sheets

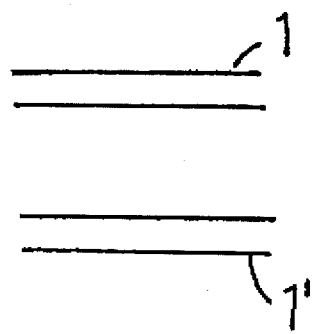
FIG. 1A (PRIOR ART)
FIG. 2
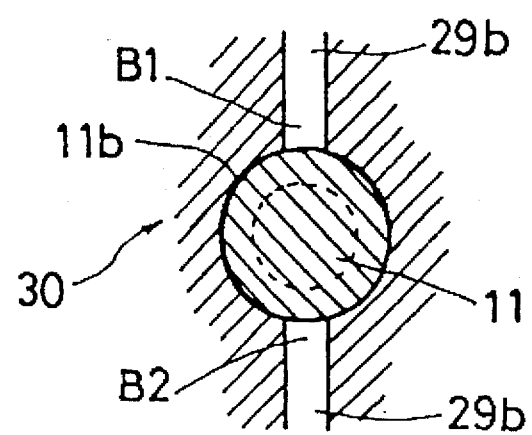

TOROIDAL CONTINUOUS VARIABLE TRANSMISSION

BACKGROUND OF THE INVENTION

1. Field of the Invention

The present invention relates to a toroidal continuous variable transmission with a speed change unit that comprises an input disk and an output disk arranged opposite each other, a pair of power rollers which rotate in contact with both of the disks to transmit the input disk rotation to the output disk while continuously changing the speed of the input disk rotation according to a tilt angle, and a trunnion supported on the power rollers.

2. Description of the Prior Art

The toroidal continuous variable transmission mounted in automobiles is generally a double cavity type toroidal continuous variable transmission, which has two speed change units arranged on the same axis. The toroidal continuous variable transmission mainly comprises: an input shaft that receives the engine output; a pair of input disks supported in such a way as to be rotatable relative to the input shaft; a pair of output disks arranged opposite the input disks and supported rotatable with respect to the input shaft; tiltable power rollers arranged between the paired, opposing input disks and output disks to transmit torque from the input disks to the output disks; a connecting member to couple together the opposing output disks; and pressing means arranged between the input disks and paired flange portions provided to the input shaft to act on the input disks to change the pressing force of the power rollers according to the magnitude of the input torque. The power rollers are tilted to change the rotation speed of the input disks continuously in transmitting the rotation of the input disks to the output disks.

Such a toroidal continuous variable transmission tilts the power rollers by a speed change control device. A variety of kinds of toroidal continuous variable transmission have been known (for example, Japan Patent Laid-Open Nos. 184262/1986, 82065/1986 and 46090/1987). One such toroidal continuous variable transmission is shown in FIG. 4. To simplify explanation in FIG. 4, a speed change control device is shown to have only one speed change unit. Because the double cavity type toroidal continuous variable transmission need only be constructed to be able to supply oil pressure also to the hydraulic cylinder of another speed change unit, explanation about the double speed change unit is omitted.

As shown in FIG. 4, a pair of power rollers 2 in the speed change unit 1 are arranged opposite each other between opposing input disk 3 and output disk 3' and are each rotatably supported on support members of trunnions 4. That is, the power rollers 2 are supported on the trunnions 4 through eccentric shafts 5. The trunnions 4 are pivotably supported on the transmission casing (not shown) about each axis at the center of arcs—the arcs of the opposing disks on a plane that includes the rotating axes of the power rollers 2 and the rotating axes of the both disks—that form the toroidal surfaces of the input disks 3 and the output disks. The trunnions 4 are also supported axially movable along the pivot axis 6. The trunnion 4 has a tilt axis or pivot axis 6, about which it can be pivoted and in the direction of which it can be moved. The tilt axis 6 of the trunnion 4 is rigidly fitted with a piston 7, which is slidably installed in a hydraulic cylinder 8 formed in the transmission casing. In the hydraulic cylinder 8 there are formed two cylinder chambers 8a and 8b divided by the piston 7.

The cylinder chambers 8a, 8b of the hydraulic cylinder 8 communicate with a spool valve 10 through oil passages 9a, 9b. A spool 11 slidably installed in the spool valve 10 is held at the neutral position by springs 12 disposed at the axial ends of the valve. The spool valve 10 is formed with an Sa port at one end and with an Sb port at the other end. The Sa port is supplied with a pilot pressure through a solenoid valve 13a and the Sb port with a pilot pressure through a solenoid valve 13b. The spool valve 10 has a P port communicating with the pump pressure (hydraulic pressure source), an A port communicating with the cylinder chamber 8a through the oil passage 9a, a B port communicating with the cylinder chamber 8b through the oil passage 9b, and T ports connected to a drain 50. The solenoid valves 13a, 13b are operated according to control signals output from a controller 14.

One of the tilt axes 6 is connected at one end with a precess cam 15, against which one end of a lever 16 pivotably supported at the center is pressed. The other end of the lever 16 is connected to a potentiometer 17. The potentiometer 17 detects, in the form of a synthetic displacement, the axial displacement of the trunnions 4 in the direction of the tilt axes 6 and their tilt angle and supplies the detected signal to the controller 14. The speed change control device also has a car speed sensor 18, an engine revolution sensor 19, and a throttle opening sensor 20. Transmission information signals such as car speed, engine revolution and throttle opening detected by these sensors are fed to the controller 14.

The toroidal continuous variable transmission performs the speed change control by utilizing the fact that when the trunnions 4 are moved toward either direction of the tilt axes (in the axial direction of the tilt axes 6) from the neutral position (the position where the rotation axes of the power rollers 2 cross the rotation axes of the input disk 3 and output 3'), the trunnions 4 tilt about the tilt axes 6 in a direction and at a speed that correspond to the direction and the amount of displacement, thereby changing the rotation speed.

Next, the operation of the speed change control device is described. First, the controller 14 calculates an actual transmission ratio from the synthetic displacement of the trunnions 4 detected by the potentiometer 17 and, based on the difference between the actual transmission ratio and the target transmission ratio, sets a target displacement of the trunnions 4 and outputs control signals to the solenoid valves 13a, 13b. According to the control signals, the solenoid valves 13a, 13b supplied oil pressures Sa, Sb to the ends of the spool valve 10. At this time, when the oil pressures supplied to the spool valve 10 are in the relation of Sa>Sb (Sa and Sb are oil pressures at Sa port and Sb port, respectively), the spool 11 shifts toward left in FIG. 4, connecting the oil passage 9a to the pressure source P through the P port and the oil passage 9b to the drain through the T port, causing the pressure Pa of the oil passage 9a to be higher than the pressure Pb of the oil passage 9b (Pa>Pb). The resulting pressure difference between the cylinder chambers 8a and 8b causes the trunnions 4 on the left side in FIG. 4 to move down and the trunnion 4 on the right side to move up. As they move vertically in this way, the trunnions 4 pivot about the tilt axes 6, starting the speed change operation. The controller 14 performs the feedback control to cause the actual transmission ratio to approach the target transmission ratio. As the actual transmission ratio approaches the target transmission ratio, the target displacement of the trunnions 4 approaches zero. When the actual transmission ratio agrees with the target transmission ratio, the target displacement of the trunnions 4 becomes zero, terminating the speed change operation.

With the conventional speed change control device, when the actual transmission ratio agrees with the target transmission ratio and the target displacement of the trunnions 4 is zero, the pressures acting on the ends of the spool valve 10 are equal (Sa=Sb), returning the spool 11 of the spool valve 10 to the neutral position, with the result that the pressures of the two cylinder chambers 8a, 8b are equal (Pa=Pb).

In the conventional speed change control device, however, because the cylinder chamber 8a of one hydraulic cylinder 8 and the cylinder chamber 8a of the other hydraulic cylinder 8 are interconnected by pipes branched from a oil passage 9a running from the A port, they are directly coupled hydraulically. Further, the cylinder chamber 8b of one hydraulic cylinder 8 and the cylinder chamber 8b of the other hydraulic cylinder 8 are also connected by pipes branched from a branch oil passage 9b running from the B port, they are directly coupled hydraulically. Let us consider a situation where the difference between the actual transmission ratio and the target transmission ratio is smaller and the spool 11 of the spool valve 10 is located at or near the neutral position, with the A port of the oil passage 9a and the B port of the oil passage 9b closed by the land portions of the spool 11. When in this condition the trunnion 4 on the left side receives a sudden, downward (in the drawing) force due, for example, to torque variations of the input disk 3, the pressure Pb in the cylinder chamber 8b of the hydraulic cylinder 8 on the left side rapidly increases. The increased pressure Pb is transmitted to the hydraulic cylinder 8 on the right side, rapidly increasing the pressure Pbr in the cylinder chamber 8b. In this case, the trunnion 4 on the right side is normally acted upon by a force of the same magnitude as the force acting on the left-side trunnion 4 but in the opposite direction (say, in the upward direction in the drawing). The force is offset by the transmitted pressure Pbr in the cylinder chamber 8b of the right-side hydraulic cylinder 8, thus causing almost no displacement of either trunnion 4.

When there are variations in the rotation of the input disk 3, a difference may occur momentarily between the pressing forces that the input disk 3 applies to the left and right power rollers 2. In that case, the left and right power rollers 2 receive tangential forces F of differing magnitudes in the direction of arrow F in FIG. 4 from the input disk 3 and output 3', resulting in imbalance between the pressures in the cylinder chambers 8a, 8b of the left and right hydraulic cylinders 8. This in turn causes a difference in the forces acting on the left and right trunnions 4. When, for instance, the pressing force that the input disk 3 applies to the right power roller 2 is smaller than the pressing force that the input disk 3 applies to the left power roller 2, the upward force acting on the right-side trunnion 4 becomes smaller than the downward force acting on the left-side trunnion 4.

Thus, the left-side trunnion 4 is moved downward by the large downward force. At the same time, because the pressure Pbr in the cylinder chamber 8b of the right hydraulic cylinder 8 is equal in magnitude to the pressure Pbl in the cylinder chamber 8b of the left hydraulic cylinder 8 and is greater than the pressure Par in the cylinder chamber 8a of the right hydraulic cylinder 8, the right-side trunnion 4 also moves down. In this condition, there occurs sliding at the contact point between the power rollers 2 and the input disk 3, producing friction heat, which in turn leads to degradation of durability and efficiency of the speed change device. If such an input is repeated at certain intervals, the trunnions 4 oscillate in phase and become unstable, getting out of speed change control.

Under these situations, there is a growing demand for providing the left and right hydraulic cylinders with independence to ensure that even when tangential forces of differing magnitudes are applied to the left and right power rollers when the spool valve is near the neutral position, the trunnions can be prevented from affecting each other through the hydraulic circuits.

Another example of the toroidal continuous variable transmission is described in Japan Patent Laid-Open No. 127965/1986. To simplify the control by activating one of movable members of a control valve, this toroidal continuous variable transmission is characterized in that the actuator to drive one of the movable members of the control valve comprises a hydraulic piston, a spring installed in one of chambers of the hydraulic piston to urge the piston to the other side, and a solenoid valve that controls oil pressure supplied to the other chamber of the piston according to signals from the speed change control device.

A toroidal continuous variable transmission for use in automobiles as shown in FIG. 5 has been known. This transmission includes an input shaft 111 that receives an engine output, an input disk 112 rotatably supported on the input shaft 111, an output disk 113 disposed opposite the input disk 112 and rotatably supported on an output shaft 108, tiltable power rollers 103 disposed between the input disk 112 and the output disk 113 to transfer torque from the input disk 112 to the output disk 113, and trunnions 104 that supports the power rollers 103. The power rollers 103 are tilted to change the rotation speed of the input disk 112 continuously according to a tilt angle in transmitting the rotation of the input disk 112 to the output disk 113. The toroidal continuous variable transmission with the above construction tilts the power rollers 103 by a speed change control device.

The power rollers 103 in the speed change unit are disposed opposite each other between the opposing input disk 112 and output disk 113 and are rotatably supported on the trunnions 104, the supporting members, through eccentric shafts. The trunnions 104 are supported rotatably and axially movably on a casing of the transmission (not shown). That is, the trunnions 104 each have a tilt shaft 122, about which they are rotated and along which they are moved. The tilt shaft 122 of the trunnion 104 is secured with a piston 114, which is slidably installed in a hydraulic cylinder 115 formed in the transmission casing. In the hydraulic cylinder 115 there are formed cylinder chambers 116, 117 separated by the piston 114.

The cylinder chambers 116, 117 of the hydraulic cylinder 115 communicate through passages 118, 119 to a spool valve 120. A spool 101 in the spool valve 120 is held at the neutral position by a spring 121 installed at an axial end of the valve. The spool valve 120 has a port P connected to a pump pressure (pressure source), a port A connected to the cylinder chamber 116 through the passage 118, a port B connected to the cylinder chamber 117 through the passage 119, and a drain port T connected to a drain. Between the spool valve 120 and the spool 101 is movably fitted a sleeve 106 that has ports communicating to the ports A, B, P, T. The sleeve 106 is driven by an actuator 105 according to the control signal from a controller 107.

The front end of one of the tilt shafts 122 is connected to a precess cam 102, against which one end of an oscillation layer 123 pivotably supported at the center is pressed. The other end of the oscillation lever 123 is pressed against the spool 101. The oscillation lever 123 transmits the axial displacement and rotation angle of the tilt shaft 122 of the trunnions 104 in the form of a synthetic displacement to the spool 101. The speed change control is performed by utilizing the fact that when the trunnions 104 are moved toward either direction of the tilt shafts (in the axial direction of the tilt shafts 122) from the neutral position (the position where the rotation axes of the power rollers 103 cross the rotation axes of the input disk 112 and output disk 113), the trunnions 104 pivot about the tilt shafts 122 in a direction and at a speed that correspond to the direction and amount of the displacement, thereby changing the rotation speed. The toroidal continuous variable transmission also has a car speed sensor, and engine revolution sensor, and a throttle opening sensor. Transmission information signals such as car speed, engine revolution and throttle opening detected by these sensors are fed to the controller 107.

Next, the operation of the toroidal continuous variable transmission of the above construction is described. The spool 101 of the spool valve is connected through the precess cam 102 to the trunnion 104 that supports the power roller 103 and is held at a position corresponding to the synthesized displacement of the tilt angle of the trunnion 104 and axial movement of the tilt shaft 122. The actuator 105 controls the axial position of the sleeve 106 according to the signals from the controller 107. For example, when the sleeve 106 moves toward right from the position of FIG. 5, its position relative to the spool 101 changes, communicating the passage 119 to the port P and the passage 118 to the drain port T. As a result, the oil pressure in the passage 119 becomes higher than the oil pressure in the passage 118, offsetting the trunnion 104 downward through the piston 114. At this time, the side slip force causes the power rollers 103 to tilt about the tilt shaft 122 in the direction of arrow DOWN.

As the power rollers 103 pivot, the spool 101 shafts toward right by an amount corresponding to the power rollers' combined displacement consisting of the displacement in the tilt shaft axial direction and the tilt angle, throttling the communication between the port P and the passage 119 and between the drain port T and the passage 118 until the relative position between the sleeve 106 and the spool 101 becomes neutral, at which time the pressures of the passage 118 and the passage 119 are equal. In this state, however, because the power rollers 103 stay offset down in the axial direction of the tilt shaft 122, they continue pivoting by the side slip force, causing the spool 101 to move toward left from the neutral position with respect to the sleeve 106. As a result, the oil pressure in the passage 119 becomes lower than the oil pressure in the passage 118, and the trunnion 104 is moved upward through the piston 114, reducing the displacement in the tilt shaft axial direction of the power rollers 103 and therefore the slide slip force and the tilting speed. In the toroidal continuous variable transmission described above, the above sequence of operation is repeated. The speed change operation is ended when the displacement of the power rollers 103 in the tilt shaft axial direction is zero and the position of the spool 101 is neutral with respect to the sleeve 106.

In the toroidal continuous variable transmission of the above construction, however, when an electrical fault occurs resulting in a failure of the actuator 105, the position of the sleeve 106 cannot be controlled by the command signal from the controller 107. For this reason, because in the event of an electrical failure the position of the sleeve 106 is held or is fixed at a predetermined position, the transmission ratio of the speed change unit is also fixed at a transmission ratio corresponding to the position of the sleeve 106. In the toroidal continuous variable transmission, therefore, to prevent a sudden engine braking from being applied in the event of an electrical failure when the car is running at high speed, the predetermined transmission ratio is set on the speed-increase side. When, however, the car stops with the transmission ratio left set on the speed-increase side, the car may be put in a dangerous situation where it lacks a driving power at the starting and, in the worst case, cannot start at all when it stops at a slope or when it is heavily loaded.

SUMMARY OF THE INVENTION

A primary objective of this invention is to provide a toroidal continuous variable transmission that can solve the above-mentioned problems and in which when the spool valve is at or near the neutral position and tangential force of different magnitudes act on the power rollers, the trunnions supporting the power rollers are prevented from being displaced in the same phase, thereby providing a stable transmission ratio with high efficiency and reducing the amount of heat produced.

Another object of this invention is to provide a toroidal continuous variable transmission, which, in response to a signal pressure produced by the opening and closing of the governor valve provided on the shaft such as output shaft whose revolution represents the car speed, shifts the sleeve to a position corresponding to a predetermined transmission ratio on the speed-decrease side when the car is traveling at low speed; which changes the transmission ratio toward the speed-decrease side when an electric system failure occurs while the car is traveling at low speed in order that the car can start even when the car stops on a slope or is heavily loaded; and which, when the car is traveling at high speed, holds the transmission ratio used at the time of failure as in the conventional transmission or change the transmission ratio to a predetermined value on the speed-increase side, in order to prevent sudden engine braking from being activated, thereby ensuring safe driving of the vehicle.

This invention relates to a toroidal continuous variable transmission which comprises: input disks and output disks arranged opposite each other; a pair of power rollers that continuously change the rotation speed of the input disks according to a change in their tilt angle with respect to the input disks and the output disks in transmitting the rotation of the input disks to the output disks; a pair of trunnions that rotatably support the power rollers and tilt the power rollers about tilt shafts as the trunnions move from the neutral position in the axial direction of the tilt shaft; hydraulic cylinders each having two cylinder chambers to displace the trunnions in the axial direction of the tilt shaft; spool valves having spools; and a controller to control the axial positions of the sleeves by moving them by actuators; wherein the spool valves, when the spools are at the neutral position, individually cut off the cylinder chambers and, when the spools are displaced from the neutral position, connect the cylinder chambers on one side to an oil pressure source and the cylinder chambers on the other side to a tank.

The spool valves are controlled according to the difference between an actual transmission ratio and a target transmission ratio, the actual transmission ratio being calculated from a detected displacement of the trunnions in the axial direction of the tilt shaft and from a detected tilt angle of the trunnions, the target transmission ratio being calculated from detected speed change information.

The cylinder chambers of the hydraulic cylinder of one of trunnions communicate to the corresponding cylinder chambers of the hydraulic cylinder of the other trunnion through ports that are simultaneously opened and closed by land portions formed at the same axial position on the spool.

The controller controls the spool valves according to the difference between the actual transmission ratio and the target transmission ratio. The actual transmission ratio is calculated from the detected displacement of the trunnions in the axial direction of the tilt shaft and from a detected tilt angle of the trunnions. The target transmission ratio is calculated from speed change information collected from various sensors such as a car speed sensor, an engine revolution sensor and a throttle opening sensor. When the spool is switched from the neutral position to the first position or second position, oil pressure is supplied to one of the cylinder chambers of each hydraulic cylinder, with the other cylinder chamber connected to the drain. As a result, the pistons of the hydraulic cylinders are displaced, causing the trunnions to move from the neutral position in the axial direction of the tilt shaft. As the trunnions move from the neutral position, the power rollers tilt, starting the speed change operation. The feedback control is performed to bring the actual transmission ratio close to the target transmission ratio. When the actual transmission ratio agrees with the target transmission ratio, the spool valves are closed stopping the supply of oil pressure to the hydraulic cylinders, thus terminating the speed change operation. At this time, the trunnions are returned to the neutral position.

When the spool valves are at the neutral position, the cylinder chambers of the hydraulic cylinder of each trunnion are shut off individually by the spools from the corresponding cylinder chambers of the other trunnion. In this condition, when the power rollers receive tangential forces from the input and output disks due to torque variations of the input disk, a sudden axial force is produced that acts on the trunnion. In that case, a sharp increase or decrease may occur in the pressure of the working oil in the hydraulic cylinder of the trunnion. Such a sharp pressure change in the hydraulic cylinder in one of the trunnions, however, is blocked by the spool and is not transmitted to the hydraulic cylinder of the other trunnion.

Therefore, the trunnions are prevented from being displaced in the axial direction and any pressure change in one hydraulic circuit is prevented from adversely affecting other hydraulic circuits connected to the spool. Furthermore, this transmission can eliminate other drawbacks of the conventional toroidal continuous variable transmission, such as heat that may be produced by the slip between the input disk and the power rollers as the trunnion is displaced in the axial direction, and also in-phase vibrations of the trunnions that may occur when the trunnions are cyclically displaced in the axial direction. With this invention, it is possible to provide a toroidal continuous variable transmission with high efficiency, stability and durability. In other words, the piston of each hydraulic cylinder is hydraulically locked, so that the trunnions cannot be moved in the axial direction, preventing slips and therefore heating at the friction contact point. This ensures stability, high efficiency and excellent durability.

When the cylinder chambers of the hydraulic cylinder of one trunnion are connected to the corresponding cylinder chambers of the other trunnion through the ports that are closed or opened simultaneously by the land portions formed at the axially same position on the spool, there are formed two systems of hydraulic passages connecting the cylinder chambers of the two trunnions. As the spool valve is operated, four ports leading to two cylinder chambers of each cylinder are simultaneously opened or closed by the two land portions of the spool so that the two oil passage systems are brought into simultaneous but alternate communication with the oil pressure source and the tank. The above configuration offers the simplified land structure. With the spool valve at the neutral position, not only are the two systems of hydraulic circuit shut off from the oil pressure source and the tank by the spool valve installed in the hydraulic system but also the cylinder chambers of one trunnion are blocked from the corresponding chambers of the other trunnion. Hence, the pistons of the hydraulic cylinders can be hydraulically locked in the axial direction of the trunnion.

Because this toroidal continuous variable transmission employs simple hydraulic circuits which, rather than using special sensors or a controller with high processing power, makes improvement in the arrangement and structure of the spool valves and oil passages, the overall structure becomes simple and less expensive.

This invention relates to a toroidal continuous variable transmission which comprises: input disks and output disks arranged opposite each other; power rollers that continuously change the rotation speed of the input disks according to a change in their tilt angle with respect to the input and output disks in transmitting the rotation of the input disks to the output disks; trunnions that rotatably support the power rollers and tilt the power rollers about tilt shafts as the trunnions move from the neutral position in the axial direction of the tilt shaft; hydraulic cylinders each having two cylinder chambers to displace the trunnions in the axial direction of the tilt shaft; spool valves having spools to adjust oil pressures to the hydraulic cylinders; sleeves incorporated in the spool valves so that they can be shifted in the axial direction of the spool, to set the transmission ratio to a predetermined value; a controller to control the axial positions of the sleeves by moving them by actuators; and a sleeve position setting means which responds to a car speed when the actuators fail and which, when the car is running at low speed, fixes the sleeve setting position to a predetermined transmission ratio on a speed-decrease side and, when the car is running at high speed, holds the transmission ratio used at time of failure or changes it to a predetermined transmission ratio on a speed-increase side.

A signal pressure acting on the sleeves is determined by a governor valve mounted on the output shaft that is opened when the car is running at high speed and is closed when the car is running at low speed.

The sleeve position setting means comprises a shift valve that is switched between a position that causes the signal pressure to act on the sleeves to fix the sleeves at the predetermined transmission ratio on the speed-decrease side when the car is running at low speed and a position that causes the signal pressure acting on the sleeves to become zero when the car is running at high speed.

The spool valves are so constructed that one end surface of the sleeves receives oil pressure of the cylinder chambers on one side and that the other end surface of the sleeves receives oil pressure of the cylinder chambers on the other side.

In this toroidal continuous variable transmission, the sleeve—which is fitted between the spool valve body and the spool so that it can be shifted in the axial direction of the spool, and is urged at all times by a spring force toward the neutral position and which sets the transmission ratio to a predetermined value—is operated in response to the car speed when the actuator driven by controller fails. That is, this transmission has a sleeve position changing means that fixes the sleeve at a position corresponding to a predetermined transmission ratio on the speed-decrease side when the actuator operation fails while the car is traveling at slow speed. Hence, when the electric system is normal, the sleeve is controlled by the actuator according to the controller command signal. When on the other hand the electric system fails removing the actuator out of the working condition when the car is running at low speed, the sleeve position changing means fixes the sleeve to a position corresponding to a predetermined transmission ratio on the speed-decrease side. When the failure occurs when the car is running at high speed, the sleeve position changing means is reset by a return spring to hold the transmission ratio used at the time of failure or changes the transmission ratio to a predetermined value on the speed-increase side, thereby preventing sudden engine braking from being applied.

In this toroidal continuous variable transmission, in response to the signal pressure produced by the governor valve—which is mounted on a shaft such as output shaft whose revolution represents the car speed and which is opened at high car speed and closed at low car speed—the sleeve is shifted to a predetermined position on the speed-decrease side when the car is running at low speed. Even when the electric system fails, the sleeve is fixed to the speed-decrease side if the car is traveling at low speed. This allows the car to restart even when it stops on a slope or is heavily loaded. When the car stops with a transmission ratio representing the car speed higher than a predetermined speed, this toroidal continuous variable transmission either holds the transmission ratio used at time of failure as in the conventional transmission or changes the transmission ratio to a predetermined value on the speed-increase side, thus preventing sudden engine braking from being activated and assuring safe running.

That is, this toroidal continuous variable transmission, when the system is performing normally, controls the transmission ratio by moving the sleeve by the actuator according to the controller signal. In the event that a failure occurs with the electrical system removing the actuator out of working condition, the sleeve is set to one of the two transmission ratios, one on the speed-decrease side and one on the speed-increase side, according to the car speed.

BRIEF DESCRIPTION OF THE DRAWINGS

FIG. 1A is a schematic diagram along section 1A—1A of the toroidal continuous variable transmission of FIG. 1.

FIG. 2 is a cross section taken along the line 2—2 of FIG. 1 showing the structure of the spool valve used in the toroidal continuous variable transmission of FIG. 1;

DETAILED DESCRIPTION OF THE EMBODIMENT

Figure 1:
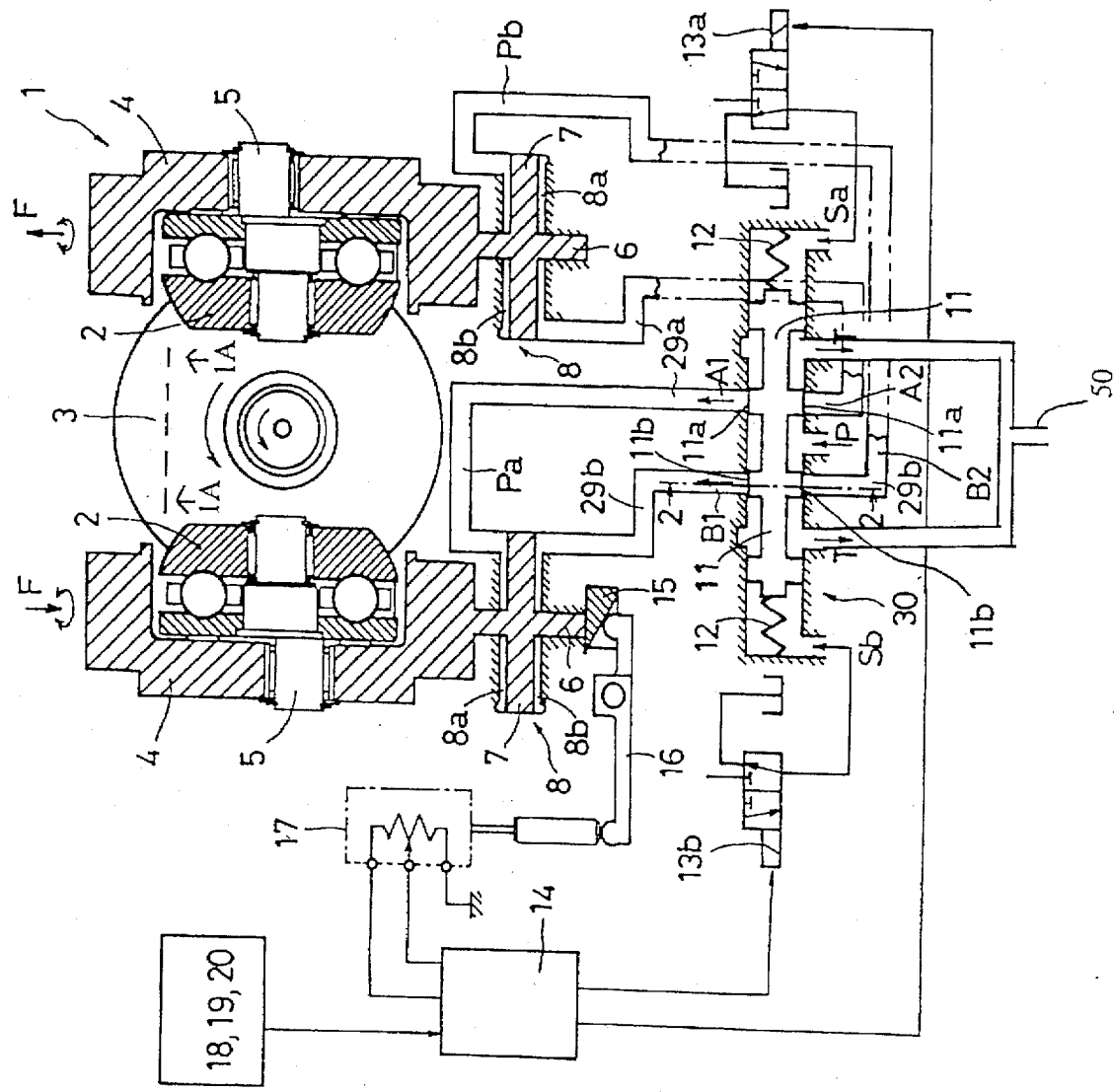
FIG. 1 is a schematic cross section showing one embodiment of the toroidal continuous variable transmission according to the present invention.
Figure 4:
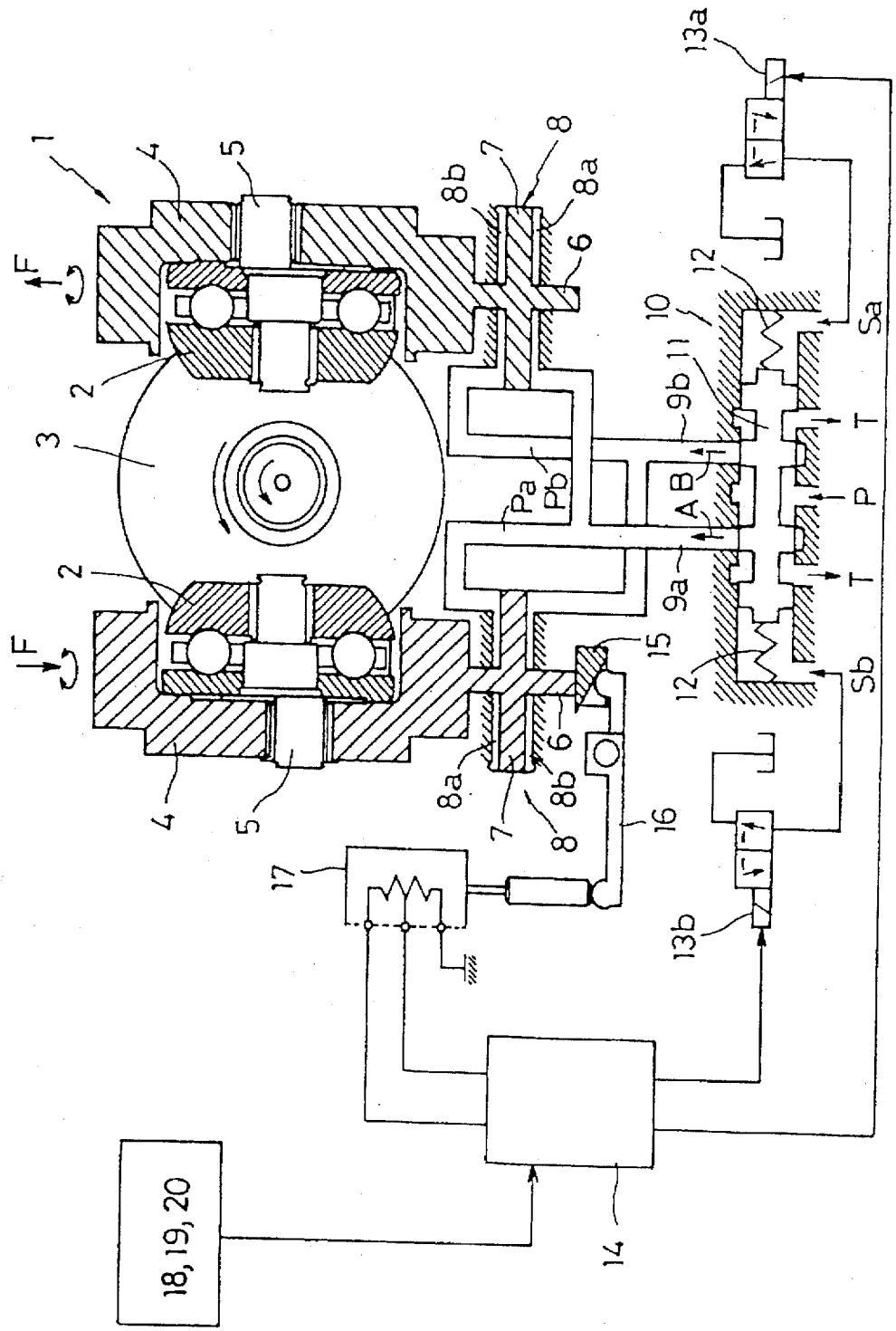
FIG. 4 is a schematic cross section showing a conventional toroidal continuous variable transmission.

By referring to FIG. 1 and 2, the toroidal continuous variable transmission of this invention is described. The toroidal continuous variable transmission shown in FIG. 1 has a similar construction to that of the conventional toroidal continuous variable transmission of FIG. 4, except for the spool valve structure and the configuration of hydraulic circuits to hydraulic cylinders. Hence, components identical with those of FIG. 4 are assigned like reference numbers and explanations about the structures of other than the spool valve and the hydraulic circuits are omitted.

In the speed change unit 1, an input disk 3 and an output disk 3' are arranged opposite each other and a pair of power rollers 2 are disposed between the input and output disks. The power rollers 2 rotate in contact with the both disks and can be tilted. According to the tilt angle, the power rollers 2 continuously change the rotation speed of the input disk 3 in transmitting the rotation to the output disk 3'. The power rollers 2 are each rotatably supported on the trunnions 4 through eccentric shafts 5. Hydraulic cylinders 8 are installed below the power rollers 2.

The hydraulic cylinder 8 has two cylinder chambers 8a, 8b separated by a piston 7 integrally secured to the trunnion 4. When oil pressure is supplied through a spool valve 30 to one of the cylinder chambers 8a, 8b, the trunnion 4 moves in the axial direction of a tilt shaft 6 from the neutral position. The trunnions 4 pivot about the tilt shafts as they are displaced in the axial direction of the tilt shaft. Because the power rollers 2 are rotatably supported on the trunnions 4 through the eccentric shafts 5, when the trunnions 4 move in the axial direction of the tilt shaft from the neutral position, the power rollers 2 are acted upon by a force in the direction of the speed vector from the input disk 3 and the output disk 3' and pivot or tilt about the tilt shaft.

The cylinder chambers 8a, 8a of the hydraulic cylinders 8 communicate to the spool valve 30 through the passages 29a, 29a and the cylinder chambers 8b, 8b communicate to the spool valve 30 through passages 29b, 29b. The spool valve 30 is formed with an Sa port at one end and an Sb port at the other. The Sa port is supplied with a pilot pressure Sa through a solenoid valve 13a and the Sb port is supplied with a pilot pressure Sb through a solenoid valve 13b. The spool valve 30 has a P port connected to the oil pressure source, i.e., pump pressure P, an A1 port and an A2 port connected to the cylinder chambers 8a through the passages 29a, a B1 port and a B2 port connected to the cylinder chambers 8b through the passages 29b, and T ports connected to a drain 50. The solenoid valves 13a, 13b are operated according to the control signals output from the controller 14. Springs 12 are installed at the ends of the spool 11 of the spool valve 30 to hold the spool 11 at the neutral position.

As can be seen from the cross sectional structure of the spool valve 30 shown in FIG. 2, the A1 and A2 ports are situated at the same position when viewed in the axial direction of the spool 11 so that they are closed or opened simultaneously by a large-diameter land portion 11a of the spool 11. The A1 and A2 ports are out of phase when viewed in the circumferential direction. Although, in the structure of FIG. 1, the A1 and A2 ports are shown 180° out of phase with each other, other positional relationship may be employed as long as these ports do not communicate with each other when the spool valve is at the neutral position. Similarly, the B1 and B2 ports are located at the same position (the position that is axially separate from where the A1 and A2 ports are situated) when viewed in the axial direction of the spool 11 so that they are closed or opened at the same time by a large-diameter land portion 11b of the spool 11. The phase relation in the circumferential direction between the B1 and B2 ports is the same as the relation between the A1 and A2 ports. The P port normally opens into the spool valve 30 between the land portion 11a and the land portion 11b. The T ports normally open into the spool valve 30 at positions axially outside the land 11a and the land 11b.

The spool 11 of the spool valve 30 can be selectively set to any of three axially separate positions: a first position that connects the first cylinder chambers 8a to the P port through the passages 29a and A1 and A2 ports and the second chambers 8b to the T port through the passages 29b and B1 and B2 ports; a second position that connects the first cylinder chambers 8a to the T port through the passages and ports and the second cylinder chamber 8b to the P port; and a neutral position that cuts off the both cylinder chambers 8a and 8b from the P port and T port. This selection is performed by the oil pressures supplied to the spool valve 30 from the Sa and Sb ports.

Next, the speed change control or operation of the toroidal continuous variable transmission of this invention is explained. First, the controller 14 calculates the actual transmission ratio from the synthesized displacement of the trunnions 4 involving the displacement in the axial direction of the tilt shaft and the tilt angle, detected by the potentiometer 17. The detected values supplied from various sensors, such as car speed sensor 18, engine revolution sensor 19 and throttle opening sensor 20, are used to calculate a target transmission ratio. The controller 14 sets a target displacement from the difference between the actual transmission ratio and the target transmission ratio and outputs control signals to the solenoid valves 13a, 13b. Upon receiving the control signals, the solenoid valves 13a, 13b supply oil pressures Sa, Sb to the ends of the spool valve 30. If the pressure relationship is Sa>Sb, for instance, the spool 11 shifts to the left in FIG. 1 connecting the passages 29a through the P port to the oil pressure source and connecting the passages 29b through the T port to the drain 50. As a result, the pressure Pa in the passages 29a becomes higher than the pressure Pb in the passages 29b (Pa>Pb).

When a pressure difference occurs between the cylinder chambers 8a and 8b (Pa>Pb), the trunnion 4 on the left side in FIG. 1 moves down in the axial direction of the tilt shaft from the neutral position and at the same time the trunnion 4 on the right side moves up from the neutral position. As the trunnion 4 moves in the axial direction of the tilt shaft, it simultaneously pivots about the tilt shaft 6, initiating the speed change operation. As the actual transmission ratio approaches the target transmission ratio, the displacement of the trunnion 4 comes close to zero and, when the actual transmission ratio agrees with the target transmission ratio, the controller 14 issues a control signal to close the solenoid valves 13a, 13b. As a result, the pressures Sa and Sb acting on the ends of the spool 11 are equal, causing the spool 11 to return to the neutral position, which in turn closes the A1 and A2 ports of the spool valve 30 simultaneously by the land portion 11a of the spool 11 and also closes the B1 and B2 ports simultaneously by the land portion 11b of the spool 11. At this time, the pressures Pa and Pb in the two cylinder chambers 8a and 8b are equal. That is, the pressures acting on the top and bottom surfaces of the piston 7 are equal (Pa=Pb). Now, the speed change operation is finished. In this condition, because the A1 and A2 ports are closed, the passages 29a do not communicate with each other. Also because the B1 and B2 ports are closed, the passages 29b do not communicate. Hence, the cylinder chamber 8a of one trunnion 4 is hydraulically cut off from and independent of the cylinder chamber 8a of the other trunnion 4.

With the spool valve 30 at the neutral position, when a momentary difference is produced, as by torque variations of the input disk 3, between the pressing forces that the input disk 3 applies to the left and right power rollers, forces of different magnitudes tend to displace the trunnions 4 sharply. Because, when the spool valve 30 is at the neutral position, the cylinder chambers 8a, 8b of one trunnion 4 are isolated from and hydraulically independent of the cylinder chambers 8a, 8b of the other trunnion 4, the piston 7 of the hydraulic cylinder 8 of each trunnion 4 is held immovable by the working oil contained in the passages 29a, 29b associated with the corresponding cylinder chambers 8a, 8b. Therefore, the trunnions 4 are prevented from moving in the axial direction. Other hydraulic circuits not shown that are associated with the spool valve 30 are not affected either.

Figure 3:
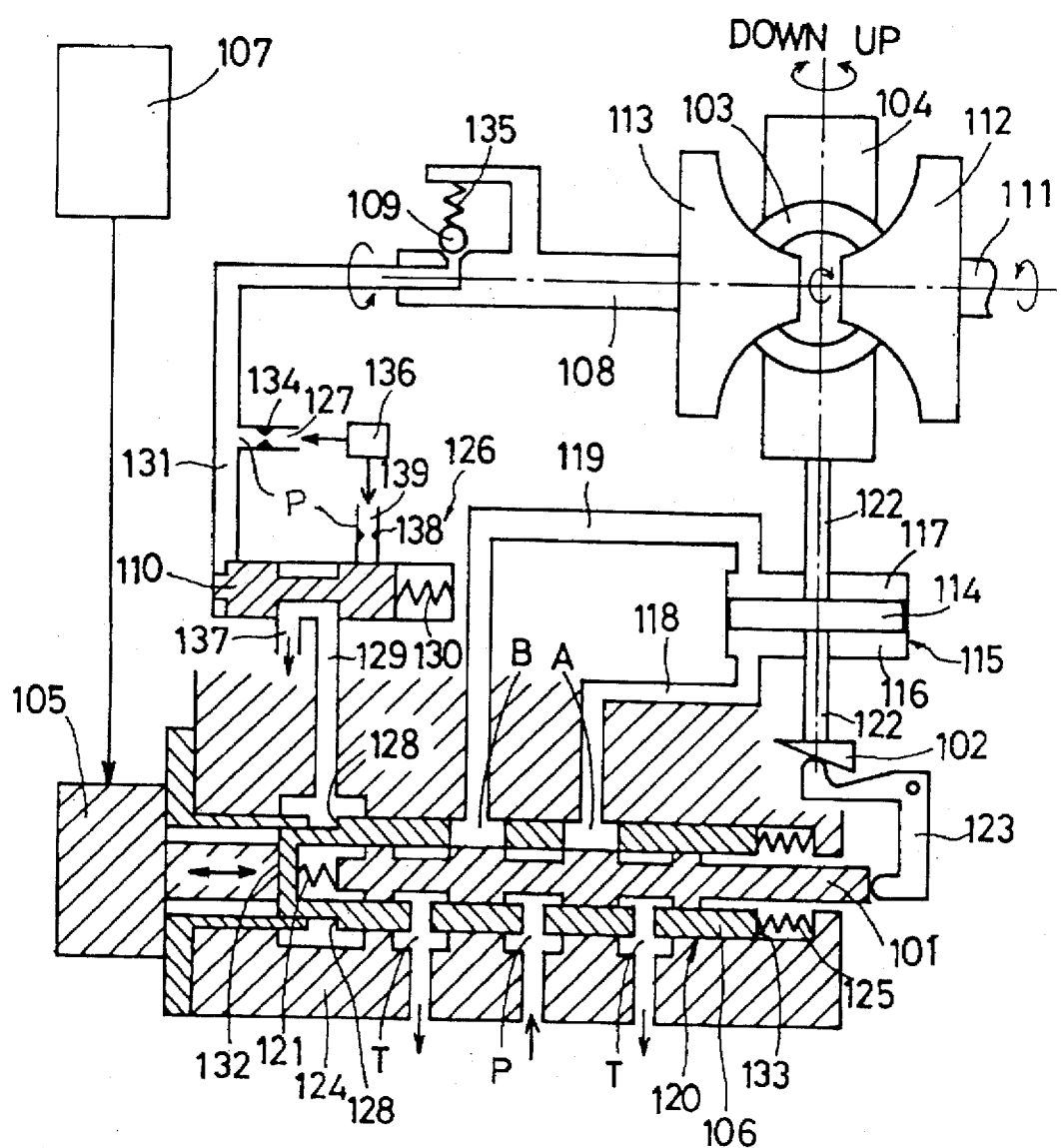
FIG. 3 is a schematic cross section showing another embodiment of the toroidal continuous variable transmission of this invention.
Figure 5:
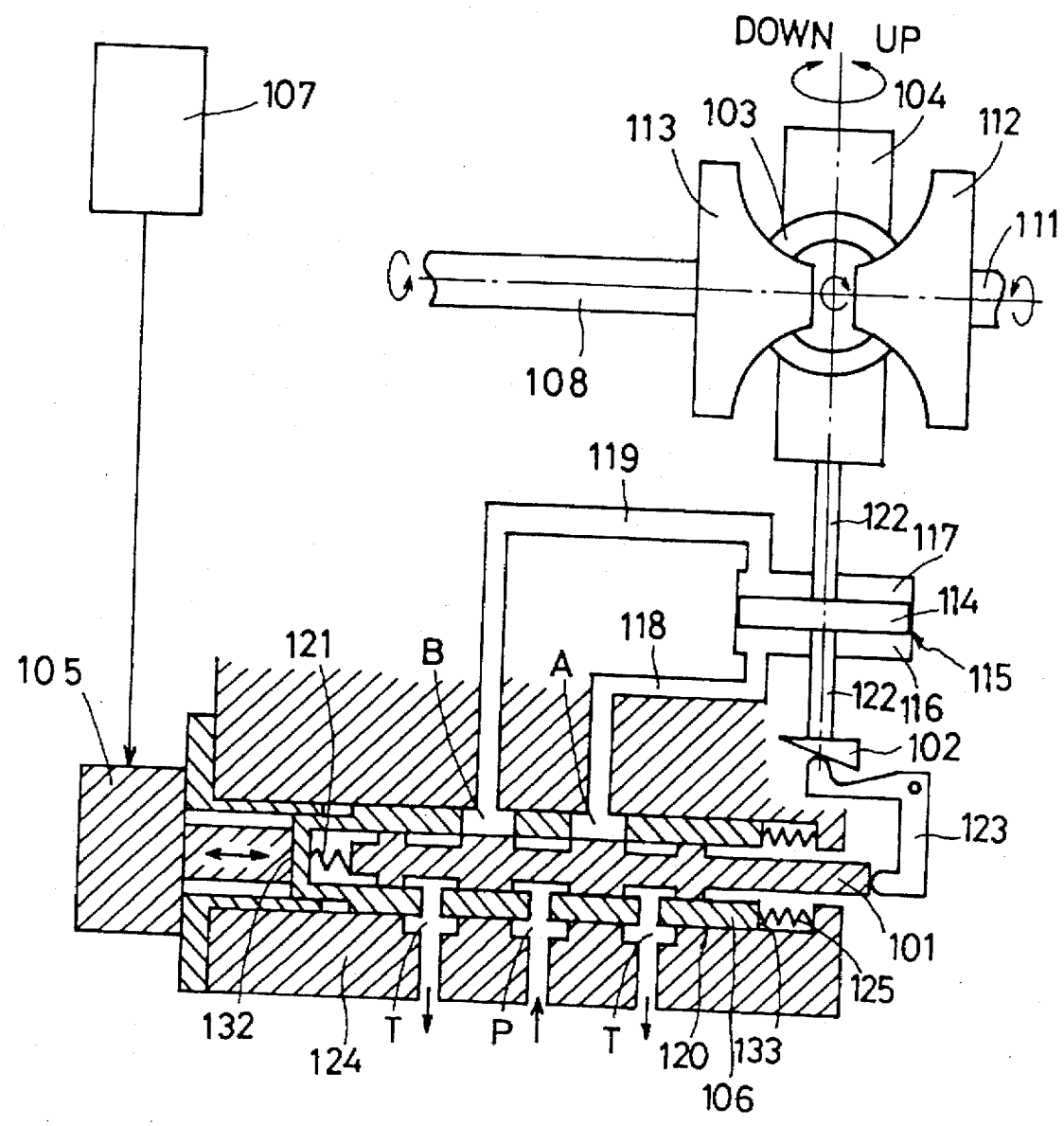
FIG. 5 is a schematic cross section showing another conventional toroidal continuous variable transmission.

Next, by referring to FIG. 3, an embodiment of a hydraulic device of the speed change unit of the toroidal continuous variable transmission according to this invention is explained. The toroidal continuous variable transmission shown in FIG. 3 is basically similar in construction to the conventional toroidal continuous variable transmission of FIG. 5, except that it has a sleeve position changing means that moves the sleeve. Hence, the identical components are given like reference numerals.

In this toroidal continuous variable transmission an input disk 112 and an output disk 113 are arranged opposite each other and a pair of power rollers 103 are disposed between the input and output disks 112, 113. The power rollers 103 rotate in contact with the both disks and can be tilted. According to the tilt angle, the power rollers 103 continuously change the rotation speed of the input disk 112 in transmitting the rotation to the output disk 113. The power rollers 103 are each rotatably supported on the trunnions 104 through eccentric shafts. Hydraulic cylinders 115 are installed below the power rollers 103.

The hydraulic cylinder 115 has two cylinder chambers 116, 117 separated by a piston 114 integrally secured to the trunnion 104. When oil pressure is supplied through a spool valve 120 to one of the cylinder chambers 116, 117, the trunnion 104 moves in the axial direction of a tilt shaft 122 from the neutral position. The trunnions 104 pivot about the tilt shafts 122 as the trunnions 104 are displaced in the axial direction of the tilt shaft. That is, because the power rollers 103 are rotatably supported on the trunnions 104 through the eccentric shafts, when the trunnions 104 move in the axial direction of the tilt shaft from the neutral position, the power rollers 103 are acted upon by a force in the direction of the speed vector from the input disk 112 and the output disk 113 and pivot or tilt about the tilt shaft together with the trunnions 104.

The cylinder chambers 116, 117 of the hydraulic cylinders 115 communicate to the spool valve 120 through the passages 118, 119. The spool valve 120 has a port P connected to an oil pressure source, i.e., pump pressure P, a port A connected to the cylinder chamber 116 through the passage 118, a port B connected to the cylinder chamber 117 through the passage 119, and a port T connected to a drain. The spool valve 120 comprises mainly a case 124 constituting a valve body, a spool 101 slidably installed in the case 124, and a cylindrical sleeve 106 slidably fitted between the case 124 and the spool 101. A return spring 125 is installed at one end of the sleeve 106 so that the sleeve 106 is returned to the initial position of the predetermined transmission ratio by a force of the return spring 125.

The toroidal continuous variable transmission includes a sleeve 106 incorporated in the spool valve 120 so that it can be shifted in the spool axis direction to set the transmission ratio to a predetermined value; a controller 107 to move the sleeve 106 by the actuator 105 to control its position in the spool axis direction; and a sleeve position setting means 126 which fixes the setting position of the sleeve 106 to the predetermined transmission ratio on the speed-decrease side in response to the car speed during the low-speed running when the actuator 105 fails and which, during the high-speed running, holds the transmission ratio that was used at time of failure or changes it to the predetermined transmission ratio on the speed-increase side. The sleeve 106 is fitted shiftable in the spool axis direction between the valve body 124 and the spool 101 and is also urged at all times by the force of the return spring 125 toward the neutral position. To keep the sleeve 106 at the predetermined setting position, the sleeve position setting means 126 has a shift valve 110 that can be switched between a position that applies a signal pressure Pp to the end of the sleeve 106 and a position that makes the signal pressure acting on the sleeve 106 zero.

In this toroidal continuous variable transmission, the end of the sleeve 106 to which the signal pressure is applied is formed with a step 128. The shift valve 110 receives at one end the signal pressure Pp from a pressure source 136 such as oil pressure source through a circuit 127 with a throttle 134 and at the other end a spring force of a return spring 130. The end of the shift valve 110 to which the signal pressure Pp is applied communicates to a governor valve 109 through a circuit 131. When the signal pressure Pp is applied to the end of the shift valve 110, the shift valve 110 moves to the right in FIG. 3, causing the circuit 129 that communicates to a stepped portion 128 of the sleeve 106 to switch from the communication with a drain port 137 into the communication with a circuit 139 having a throttle 138 leading to the pressure source 136. When the signal pressure Pp from the pressure source 136 is applied to the stepped portion 128 of the sleeve 106, the sleeve 106 moves to the right in FIG. 3.

When the output shaft 108 increases its speed, causing the governor valve 109 to open the circuit 131 to the outside against the force of the spring 135, the signal pressure of the circuit 131 becomes zero and the end of the shift valve 110 no longer receives the signal pressure Pp. With no signal pressure Pp applied to the end of the shift valve 110, the shift valve 110 is moved toward the left in FIG. 3 by the force of the return spring 130. When the shift valve 110 is returned to the initial position by the return spring 130, the circuit 129 is cut off from the communication with the circuit 139 and comes into communication with the drain port 137. With the circuit 129 connected to the drain port 137, the sleeve 106 is moved to the left in FIG. 3 by the return spring 125 and fixed to the initial transmission ratio, i.e., the transmission ratio set by the actuator 105.

The spool 101 of the spool valve 120 can be moved in the sleeve 106 and selectively set at any of three separate positions: a first position that connects the first cylinder chamber 116 to the port P and the second cylinder chamber 117 to the drain port T; a second position that connects the first cylinder chamber 116 to the drain port T and the second cylinder chamber 117 to the port P; and a neutral position that cuts off the both cylinder chambers 116, 117 from the port P and the drain port T. This selection control is performed by the actuator 105 according to the command signal from the controller 107. The port A of the passage 118 of the spool valve 120 is connected to the first cylinder chamber 116 through the passage 118. Hence, when the oil pressure is supplied from the port A to the hydraulic cylinder 115, the pressure of the port A is applied to the cylinder chamber 116. The port B of the spool valve 120 is connected to the second cylinder changer 117 through the passage 119. Hence, when the oil pressure is supplied to the hydraulic cylinder 115 from the port B, the pressure of the port B is applied to the second cylinder chamber 117.

The sleeve 106 has five through-holes or ports in the cylinder portion. When the sleeve 106 is at the neutral position, these ports correspond to the positions of the port A, port B, port P and two drain ports T, respectively, formed in the valve body 124. The sleeve 106 can be shifted axially by the pressure difference between the cylinder chambers 116 and 117. The pressure difference between the cylinder chambers 116 and 117 is also applied to the end surfaces 132, 133 of the sleeve 106, so that the amount of shift of the sleeve 106 from the neutral position is determined by the pressure difference and the force of the return spring 125.

Next, the operation of the toroidal continuous variable transmission of this embodiment is described. The spool 101 of the spool valve 120 is connected through a precess cam 102 to the trunnion 104 that supports the power rollers 103, and is held at a position corresponding to a synthesized displacement of the trunnion 104 that combines the tilt angle and the displacement in the axial direction of the tilt shaft. The actuator 105 controls the position of the sleeve 106 in the spool axis direction by pressing the sleeve 106 to the right in FIG. 3, i.e., toward the speed-decrease side according to the command from the controller 107. The movement of the sleeve 106 to the left, i.e., toward the speed-increase side, to the initial position is achieved by the force of the return spring 125. The governor valve 109 provided to the output shaft 108, when the revolution of the output shaft 108 is low, is closed by a force of the spring 135 to seal the circuit 131. Hence, the signal pressure in the circuit 131, i.e., the output signal of the supply pressure, is maintained at the signal pressure Pb from the pressure source 136 to the circuit 131. Then, the shift valve 110 moves to the right against the force of the return spring 130, disconnecting the circuit 129 from the drain port 137 and connecting it to the circuit 139 of the pressure source 136. As a result, the output signal of the signal pressure enters into the circuit 129 acting on the stepped portion 128 at the end of the sleeve 106, thus setting the transmission ratio to the predetermined value.

When the revolution speed of the output shaft 108 is high, the centrifugal force acting on the governor valve 109 opens the governor valve 109 against the force of the spring 135, draining the circuit 131. The shift valve 110 is moved to the left by the spring force of the return spring 130 causing the circuit 129 to be disconnected from the circuit 139 of the pressure source 136 and to communicate with the drain port 137. As a result, the signal pressure to the circuit 129 becomes zero and no signal pressure is applied to the stepped portion 128 at the end of the sleeve 106, fixing the transmission ratio to the initial transmission ratio, i.e., the one set by the actuator 105.

In this toroidal continuous variable transmission, consider a case, for instance, where an electrical system failure occurs while running at high speed and the actuator 105 fails. In this state, because the revolution speed of the output shaft 108 is high, the governor valve 109 is opened by the centrifugal force, opening the circuit 131, allowing the shift valve 110 to be moved to the initial position by the force of the return spring 130. As a result, the circuit 129 is opened to the drain port 137. Therefore, the sleeve 106 is not acted upon by the signal pressure from the circuit 129 and thus moves to the initial position and holds the transmission ratio corresponding to the initial position, i.e., the transmission ratio used at the time of failure occurrence. In this way, the control is performed in the same way as the conventional transmission performs control in the event of an electrical system failure.

When a fault occurs in an electrical system while traveling at slow speed and the actuator 105 fails, because the revolution speed of the output shaft 108 is low, the governor valve 109 closes, sealing the circuit 131 to maintain the signal pressure, so that the shift valve 110 retains its position against the force of the return spring 130, keeping the circuit 129 in communication with the pressure source 136. As a result, the sleeve 106 receives the signal pressure from the circuit 129 and maintains its set position.

Therefore, when a failure occurs in the electric system while running at low speed, the sleeve 106 receives the output signal of the signal pressure that acts on its stepped portion, and is forced to move toward the speed-decrease side (to the right) to a position where it is balanced with the return spring 125, thus fixing the transmission ratio to the predetermined value on the speed-decrease side. At this time, the transmission ratio fixed by the sleeve 106 is set to a value which is on the speed-increase side from the transmission ratio that is determined in normal operation for a car speed at which the governor valve 109 closes.

In this toroidal continuous variable transmission, suppose that the system is normally performing, with no electrical system failure and with the actuator 105 controlling the sleeve 106 according to the command signal from the controller 107. When the car speed is high, the circuit 131 is opened allowing the shift valve 110 to be returned to the initial position by the return spring 130, opening the circuit 129 to the drain port 137. Because the sleeve 106 receives no pressure other than that of the actuator 105, the setting of the transmission ratio of the sleeve 106 is controlled by the actuator 105 according to the command signal from the controller 107.

When the car is traveling at low speed, the circuit 131 is closed and the shift valve 110 is balanced by the signal pressure against the force of the return spring 130, connecting the circuit 129 to the circuit 139, allowing the supply pressure of the pressure source 136 to act on the sleeve 106, which is then moved toward the speed-decrease side (to the right).

At the car speed at which the signal pressure of the circuit 129 acts on the sleeve 106, however, because the transmission ratio during the normal operation is set further toward the speed-decrease side, the sleeve 106 is pushed to the speed-decrease side by the actuator 105 further from the position to which it has been pushed by the signal pressure of the circuit 129. Hence, there are no adverse effects at all on the control during normal operation. In other words, during the normal operation, the sleeve 106 is controlled for an appropriate transmission ratio by only the actuator 105 according to the command signal from the controller 107. In the event of a fault in the electrical system, the actuator 105 fails and the sleeve 106 is controlled for one of the two transmission ratios, one on the speed-decrease side and one on the speed-increase side, according to the car speed.

What is claimed is:

1. A toroidal continuous variable transmission comprising:

an input disk;

an output disk arranged opposite the input disk;

a pair of power rollers that continuously change and transmit the rotation of the input disk to the output disk according to a change in their tilt angle with respect to the input disk and the output disk in transmitting the rotation of the input disk to the output disk;

a pair of trunnions that rotatably support the power rollers and tilt the power rollers about tilt shafts as the trunnions move from the neutral position in the axial direction of the tilt shaft;

hydraulic cylinders each having two cylinder chambers to displace the trunnions in the axial direction of the tilt shaft;

a spool valve having a spool installed movable in valve bodies to adjust oil pressures to the hydraulic cylinders; and a controller to control the axial positions of the spool by moving the spool by actuators;

wherein the spool valve, when the spool is at the neutral position, individually cut off the cylinder chambers and, when the spool is displaced from the neutral position, connect one of the cylinder chambers to an oil pressure source and the other of the cylinder chambers to a drain.

2. A toroidal continuous variable transmission according to claim 1, wherein the spool valve is controlled by the controller according to the difference between an actual transmission ratio and a target transmission ratio, the actual transmission ratio being calculated from a detected displacement of the trunnions in the axial direction of the tilt shaft and from a detected tilt angle of the trunnions, the target transmission ratio being calculated from detected speed change information.

3. A toroidal continuous variable transmission according to claim 1, wherein the cylinder chambers of the hydraulic cylinder of one of the trunnions communicate to the corresponding cylinder chambers of the hydraulic cylinder of the other trunnion through ports that are simultaneously opened and closed by land portions formed at the same axial position on the spool.

4. A toroidal continuous variable transmission comprising:

an input disk;

an output disk arranged opposite the input disk;

a pair of power rollers that continuously change and transmit the rotation of the input disk to the output disk according to a change in their tilt angle with respect to the input disk and the output disk in transmitting the rotation of the input disk to the output disk;

trunnions that rotatably support the power rollers and tilt the power rollers about tilt shafts as the trunnions move from the neutral position in the axial direction of the tilt shaft;

hydraulic cylinders each having two cylinder chambers to displace the trunnions in the axial direction of the tilt shaft;

a spool valve having a spool to regulate oil pressure to the hydraulic cylinders;

a sleeve incorporated in the spool valve so that the sleeve can be shifted in the axial direction to the spool, to set the transmission ratio to a predetermined value;

a controller to control the axial positions of the sleeve by moving the sleeve by an actuator; and a sleeve position setting means which responds to a car speed when the actuator fails and which, when the car is running at low speed, fixes the sleeve setting position to a predetermined transmission ratio on a speed-decrease side and, when the car is running at high speed, holds the transmission ration used at time of failure or changes the transmission ratio to predetermined transmission ratio on a speed-increase side.

5. A toroidal continuous variable transmission according to claim 4, wherein a signal pressure acting on the sleeves is determined by a governor valve mounted on the output shaft that is opened when the car is running at high speed and is closed when the car is running at low speed.

6. A toroidal continuous variable transmission according to claim 4, wherein the sleeve position setting means comprises a shift valve that is switched between a position that causes the signal pressure to act on the sleeve to fix the sleeve at the predetermined transmission ratio on the speed-decrease side when the car is running at low speed and a position that causes the signal pressure acting on the sleeves to become zero when the car is running at high speed.

7. A toroidal continuous variable transmission according to claim 4, wherein the spool valve is so constructed that one end surface of the sleeve receives oil pressure of the cylinder chambers on one side and that the other end surface of the sleeve receives oil pressure of the cylinder chambers on the other side.

* * * * *